(12) United States Patent
McClellan-Derrickson

(10) Patent No.: US 7,188,899 B1
(45) Date of Patent: Mar. 13, 2007

(54) SAFE HUG CHILD RESTRAINT DEVICE

(76) Inventor: Ruth Helene McClellan-Derrickson, 1008 Inglewood Dr., Knoxville, TN (US) 37914

( * ) Notice: Subject to any disclaimer, the term of this patent is extended or adjusted under 35 U.S.C. 154(b) by 0 days.

(21) Appl. No.: 11/374,503

(22) Filed: Mar. 13, 2006

Related U.S. Application Data

(60) Provisional application No. 60/661,102, filed on Mar. 11, 2005.

(51) Int. Cl.
A47D 1/10 (2006.01)

(52) U.S. Cl. .................. 297/256; 297/188.06; 297/466; 297/467

(58) Field of Classification Search .......... 297/188.06, 297/188.2, 254–256, 251, 250.1, 188.04, 297/256.17, 466, 397, 485, 468, 467
See application file for complete search history.

(56) References Cited

U.S. PATENT DOCUMENTS

| 3,054,637 | A | * | 9/1962 | Pambello ................. 297/4 |
| 3,125,375 | A | | 3/1964 | Bird |
| 3,301,594 | A | | 1/1967 | Pukish |
| 3,321,247 | A | | 5/1967 | Dillender |
| 3,709,558 | A | | 1/1973 | Jakob |
| 3,992,040 | A | | 11/1976 | Gannac |
| 4,040,664 | A | | 8/1977 | Tanaka et al. |
| 5,314,232 | A | * | 5/1994 | Hopkins ............... 297/188.06 |
| 6,266,832 | B1 | * | 7/2001 | Ezell ..................... 5/640 |
| 6,402,251 | B1 | * | 6/2002 | Stoll ..................... 297/485 |
| 6,447,060 | B1 | | 9/2002 | Vila et al. |
| 6,767,058 | B2 | | 7/2004 | McClellan-Derrickson |
| 6,969,120 | B2 | | 11/2005 | Levin |
| 7,000,985 | B2 | * | 2/2006 | Belgarde ................. 297/255 |
| 2005/0110316 | A1 | * | 5/2005 | Perrotti ................. 297/250.1 |

* cited by examiner

Primary Examiner—Milton Nelson, Jr.
(74) Attorney, Agent, or Firm—Kirk A. Wilson

(57) ABSTRACT

A child restraint device for use with a vehicle seat having a back portion with a forward side and rear side, the back portion further having at least one device selected from the group consisting of head padding, adjustable shoulder belts, adjustable lap belts, and a provision for mounting the back portion to a vehicle seat. The child restraint device also has a bottom portion with a top side and bottom side. The bottom portion is foldably coupled to the back portion and has at least one device selected from the group consisting of buckle harness assembly, leg strap, and a provision for mounting the bottom portion to a vehicle seat.

10 Claims, 4 Drawing Sheets

SAFE HUG CHILD RESTRAINT DEVICE

CROSS REFERENCE TO RELATED APPLICATIONS

This application claims priority to U.S. Provisional Patent Application 60/661,102 filed Mar. 11, 2005, and is herein incorporated by reference. This application is related to U.S. Pat. No. 6,767,058, issued Jul. 27, 2004, herein incorporated by reference.

FIELD OF THE INVENTION

The present invention relates generally to child and infant protective devices and in particular to a child restraint devices designed for attachment to a vehicle seat such as an aircraft passenger seat without using vehicle seat belting.

BACKGROUND OF THE INVENTION

Current child restraint devices, commonly referred to as car seats, have only one capacity for all ages that is not applicable for zero age children or infants. The majority of these devices are large hard-shell construction and uncomfortable to transport. Most parents complain and oppose to the weight of current seats that can only be considered transportable, not portable.

Additionally, current devices are not designed to safely restrain a child of any age and size. No current restraint devices can both cradle an infant in a restrained reclined position and further restrain a child or toddler in an upright-seated position.

Child restraint devices have basically been designed for use in privately owned passenger automobiles. This use is limited to normally one or two children over the useful life of the restraint device. Furthermore, the restraint device is designed for long stable placements in normally one or two automobiles. As the restraint device is intended for long stable placements, relatively routine removal and replacement of the attached device in a passenger seat is generally a cumbersome process.

Examples of previous restraint devices include U.S. Pat. No. 6,447,060 issued to Vila et al. for a "Aircraft Seat Child Restraint Device"; U.S. Pat. No. 4,040,664 issued to Tanaka et al. for a "Harness Anchoring for Child Safety Seat": U.S. Pat. No. 3,709,558 issued to Jakob for a "Child Safety Seat"; U.S. Pat. No. 3,992,040 issued to Gannac for a "Safety Harness for Use By a Child In a Vehicle"; U.S. Pat. No. 3,321,247 issued to Dillender for a "Child's Safety Harness"; U.S. Pat. No. 3,301,594 issued to Pukish for a "Safety Harness"; and U.S. Pat. No. 3,125,375 issued to Bird et al. for a "Safety Seat Harness for Vehicle".

Between forty thousand (40,000) to fifty thousand (50,000) children under the age to two travel by airplane daily in the United States. Current Federal Aviation Administration (FAA) rules allow children under the age of two to be retained in parents' laps, which obviously provides little, if any, protection to the child during an accident or in an emergency situation.

Performance standards for child restraint systems sold in the United States are defined by Federal Motor Vehicle Safety Standard 213 (FMVSS-213). These criteria include protection from serious injury to the head, chest, and legs. Conventional restraint devices used for automobiles are inadequate for use with existing aircraft seats. There are important differences between airplane and automobile seats. The main problem is the fact that the anchor point for an automobile seat is located generally aft and below the point where the back and sitting portion of the frame members meet.

FAA's studies have shown that conventional car seats perform poorly in simulated aircraft accidents. Present standards allow for thirty-two inch head excursion. Conventional automotive seats may not meet these criteria when installed in aircraft seats. Seat belts used for existing aircraft are positioned approximately ten inches forward from the point that the automobile seat belts are located and are four inches forward of the seat bight. Thus, if aircraft seat belt is inserted through the slot in the back portion of the conventional restraint device a tight attachment of the device to the aircraft seat is not possible.

Thus, during an accident the loose attachment of a conventional car restraint device to an aircraft passenger seat would cause the restraint device to rotate or travel forward, via rotational or translational forces acting on the aircraft passenger seat. This scenario could possibly cause the child or infant disposed therein to hit his or her head against the food tray or seat disposed in the row in front of the infant or child. Accordingly, conventional restraint devices cannot be sufficiently anchored to prevent a child's head from striking the seat ahead. As such, too much forward or rotational movement is allowed. Even when the forward or rotational movement is within federal standards of thirty two inches, a child's head can still hit the seat ahead.

FAA document No. DOT/FAA/AM-94/19 entitled "The Performance of Child Restraint Devices in Transport Airplane Passenger Seats" dated September 1994 (hereinafter referred to as the "FAA Report") reports that lap belts for automobiles are attached at locations that are geometrically different from a typical airplane passenger seat. Inboard and outboard belt anchor points on an automotive seat are at different heights. The lap belts on an airplane seat are usually located near a horizontal lateral line passing through a cushion reference point. This difference results in a more vertical lap belt path over the restraint device in the airplane seat.

Additional problems with the use of conventional restraint devices are that modern automobile restraints use a short fixed-length strap on one side. The tension of the belts and shoulder straps is automatically adjusted by the retractor mechanism in the inertia reel. Typically, an automobile buckle is positioned to the inboard side of the occupant when in use. Airplane passenger seat belts are manually adjusted, and the range of adjustment is limited. The buckle on an airplane passenger seat is centered over the lower abdomen when adjusted by an adult occupant.

Another problem is that the available lateral space for the installation of a child restraint device on airplane seats is limited to the distance between the arm rests. Typically, this distance is 16.5 to 17.5 inches on economy class seats. On most economy class seats the arm rests can be raised to stowed position which provides additional space. However, seats in some rows have non-stowable arm rests. Thus, space requirements are also an important consideration for the child restraint device.

The FAA Report found that conventional forward facing restraint devices were unacceptably loose when attached to an airplane passenger seat due to vertical path of the lap belt securing the device to seat. The vertical path of the lap belt is created by the lap belt anchor point of the airplane seat. During testing, the restraint device was able to move forward approximately six inches, even with the lap belt adjusted to its minimum length. This loosely secured conventional child restraint device resulted in poor performance during testing and could cause serious injury in use. The FAA report labeled the poor interface with airplane lap belts which resulted in a very loose fit as a "misuse condition."

The FAA Report also found conventional harnesses and backless booster seats to also be dangerous for aviation use. The harnesses also allowed too much room for movement. It was found that due to the limited adjustment range and anchor location of the airplane seat lap belts, the harness restraint could not satisfactorily restrain the motion of a typical three year old child. The loose tensions of the lap belts did not provide secure restraint utilizing the harness. As to booster seats, airline seat backs, are designed to rotate forward. As the child booster seat are backless, in a crash a child could be crushed between the booster seat and the seat back. The FAA Report also found that the booster seat could not be correctly installed in an airplane seat and that the child occupant could be exposed to potential abdominal injury due to the combined effects of forces imparted from the aft row occupant and the seat back breakover.

The FAA Report concluded that the performance of certain types of child restraint devices, currently available, do not enhance the level of safety for children in transport airplane passenger seats and that the expectation of equivalent protection for children restrained in certain types of child restraint device traveling by automobile can not be met in an airplane seat. FAA Report. One of the stated reasons for these negative results is that the restraint devices are designed to meet automotive requirements, which do not necessarily adapt properly to an airplane seat. Airplane seat belts differ in anchor point geometry, tension adjustment, and buckle hardware. The lap belt anchor point geometry on airplane seats does not afford effective restraint of forward excursion of the occupant with this type of child restraint. These differences adversely affect the performance of child restraint devices designed primarily for the automobile interior.

Furthermore, any modification to any part of an aircraft requires extensive testing to be performed per strict aviation regulations. This is in addition to the cost and time which is involved for such testing and modifications of a new aircraft seat, as well as the time involved in obtaining governmental approval. Thus, the possibility of changing the position of seat belts on existing airline passenger seats, to make use with car restraint devices safe, is not practical.

Accordingly, what is needed in the art, is a child restraint device which can be safely utilized with an existing aircraft passenger in a forward facing, optionally without using the aircraft seat or lap belt. It is therefore, to the effective resolution of the aforementioned problems and shortcomings that the present invention is directed.

BRIEF SUMMARY OF THE INVENTION

The present invention is a lightweight foldable child restraint device having restraint capacity for children of all ages, i.e. zero age children or infants to toddlers. In an emergency situation, the restraint device will not rotate or travel forward, via rotational or translational forces acting on the aircraft passenger seat, thereby preventing head contact against the food tray or seat disposed in the row in front of the infant or child.

The present invention also provides an all-age child restraint device which can be used with an existing seat of a transportation device such as an aircraft passenger seat.

In all embodiments, the present invention child restraint device is designed for use primarily by common carriers and public transportation authorities with a responsibility for carriage of small children and infants coincident with one or more family members. The child restraint device is designed for use by many children over the operating life of the device. The device is also designed to accommodate the various sizes, strengths, weights and shapes of small children and infants. The present invention is easily installed onto an existing seat, while also providing for quick release of the child in emergency situations. The restraint device is secured to the vehicle seat without using a conventional seat belt or seat and shoulder belt combination. The restraint device is secured to the vehicle seat using removable strapping. All strapping can be durable elastic type with or without hook-and-loop fasteners.

The invention comprises a child restraint device for use with a vehicle seat having a back portion with a forward side and rear side, the back portion further having at least one device selected from the group consisting of head padding, adjustable shoulder belts, adjustable lap belts, and a means for mounting said back portion to a vehicle seat. The child restraint device also has a bottom portion with a top side and bottom side. The bottom portion is foldably coupled to the back portion and has at least one device selected from the group consisting of buckle harness assembly, leg strap, and a means for mounting said bottom portion to a vehicle seat.

Accordingly, it is an advantage of the present invention to provide a child and infant restraint device that can be safely utilized in transportation vehicles, including with airline passenger seats.

It is still another advantage of the present invention to provide a child and infant restraint device that is secured to a conventional airline passenger seat without any modification of the passenger seat.

It is another advantage of the present invention to provide a child and infant restraint device that does not use existing vehicle seat belt or seat and shoulder belt combination.

It is yet a further advantage of the present invention to provide a child and infant restraint device that is foldable and easily transported and stored.

It is still another advantage of the present invention to provide a child and infant restraint device that is designed for use by various children and infants and frequent and quick securement and removal from a passenger seat.

It is yet still another advantage of the present invention to provide a child and infant restraint device that is designed to accommodate children and infants of various heights and weights.

It is still a further advantage of the present invention to provide a child and infant restraint device that is easy to safely secure and remove from a passenger seat under emergency conditions.

It is yet still a further advantage of the present invention to provide a basinet portion to safely secure infants in a passenger seat.

In accordance with these and other objects which will become apparent hereinafter, the instant invention will now be described with particular reference to the accompanying drawings.

DETAILED DESCRIPTION OF THE INVENTION

Figure 1:
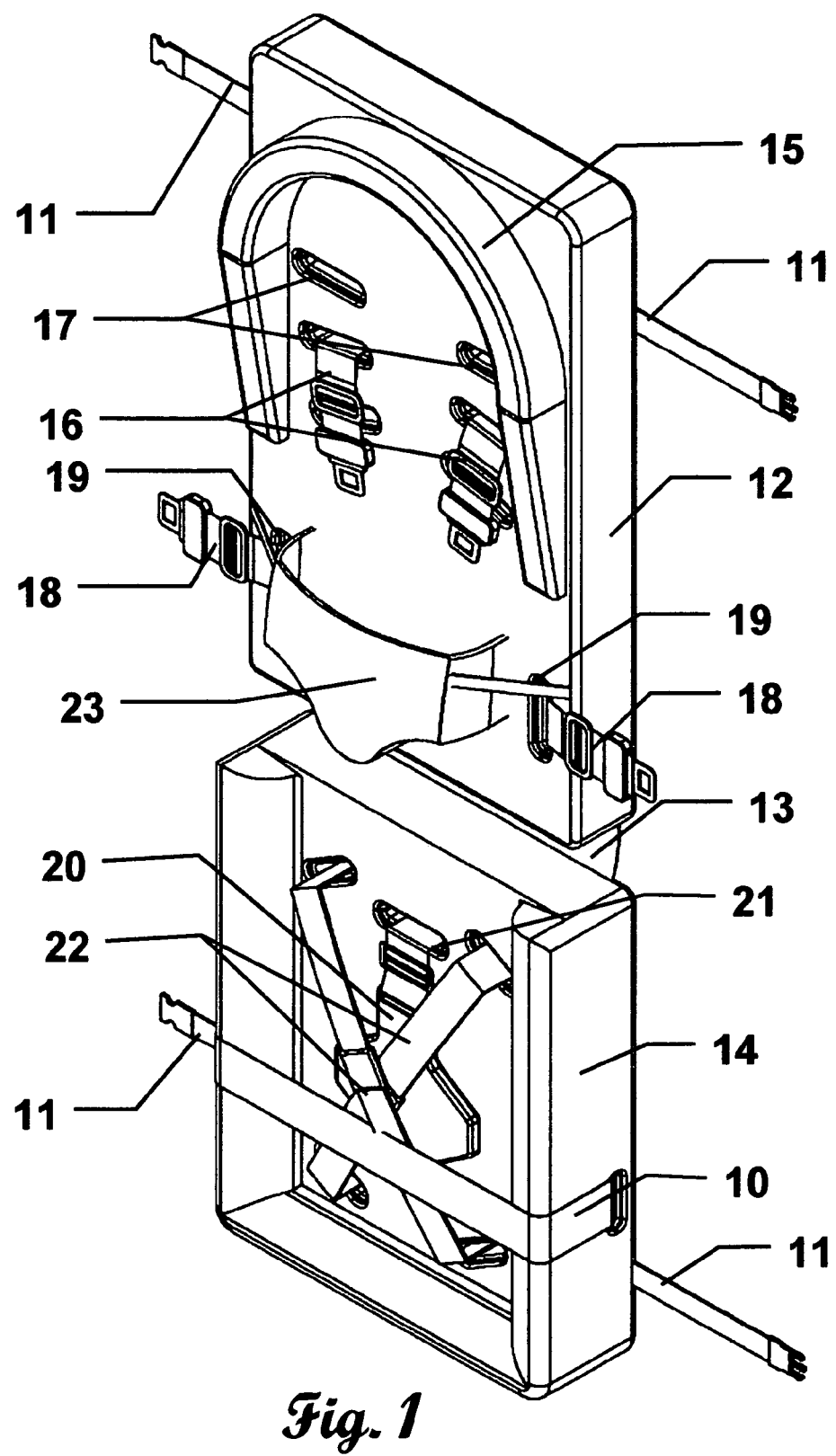
FIG. 1 is a perspective view of the portable safe hug restraint device in an open flat position.

FIG. 1 shows the child restraint device in an open flat position where the back portion 12 is opened flat and coupled to the bottom portion 14 using a flexible coupling 13. The back portion 12 has adjustable head padding 15 that adjusts to the height and size of the child. The adjustable head padding 15 can be attached to the back portion 12 using suitable means such as hook-and-loop fasteners. Adjustable shoulder straps 16 mount through multiple shoulder strap cutouts 17 in the back portion 12 positioned to align the straps for snug shoulder restraint of the child. A shoulder strap chest clip further holds the straps snug to the child. Adjustable lap belts 18 are positioned in lap belt cutouts 19 enabling snug lap restraint of the child. Back and bottom mounting straps 11 secure the child restraint device to the vehicle seat. The bottom portion 14 has a leg strap 10 for restraining leg motion of the child. A buckle harness assembly 20 is disposed in the bottom portion 14 through an assembly cutout 21 aligned generally with the crotch of the child. The buckle harness assembly 20 provides secure connection points for the shoulder belts 16 and the lap belts 18. To secure infants, cross-strapping 22 is used to restrain infants while lying in a prone position in the bottom portion 14. A toddler seat 23 is secured to the back portion 12 and can be folded flat against the back portion 12 when not needed.

Figure 2:
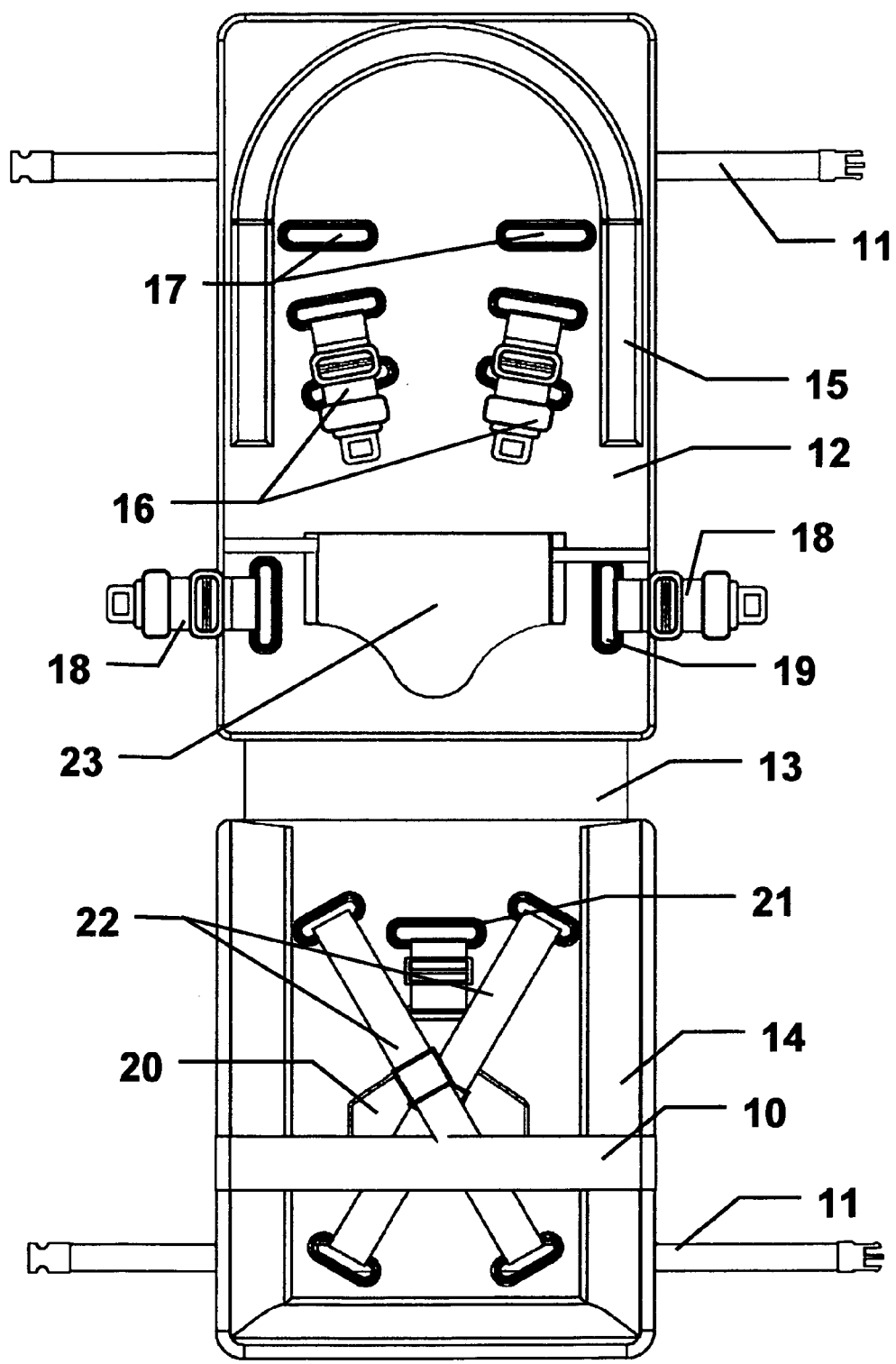
FIG. 2 is a front view of the portable safe hug restraint device in an open flat position.

FIG. 2 is a front view of the portable restraint device in an unfolded position. The back portion 12 is opened flat and coupled to the bottom portion 14 using a flexible coupling 13. The back portion 12 has an adjustable head restraint 15 that adjusts to the height and size of the child. The adjustable head restraint 15 can be attached to the back portion 12 using suitable means such as hook-and-loop fasteners. Adjustable shoulder straps 16 mount through multiple shoulder strap cutouts 17 in the back portion 12 positioned to align the straps for snug shoulder restraint of the child. A shoulder strap chest clip further holds the straps snug to the child. Adjustable lap belts 18 are positioned in lap belt cutouts 19 enabling snug lap restraint of the child. Back and bottom mounting straps 11 secure the child restraint device to the vehicle seat. The bottom portion 14 has a leg strap 10 for restraining leg motion of the child. A buckle harness assembly 20 is positioned in the bottom portion 14 through an assembly cutout 21 aligned generally with the crotch of the child. The buckle harness assembly 20 provides secure connection points for the shoulder belts 16 and the lap belts 18. To secure infants, cross-strapping 22 is used to restrain infants while lying in a prone position in the bottom portion 14. A toddler seat 23 is secured to the back portion 12 and can be folded flat against the back portion 12 when not needed.

Figure 3:
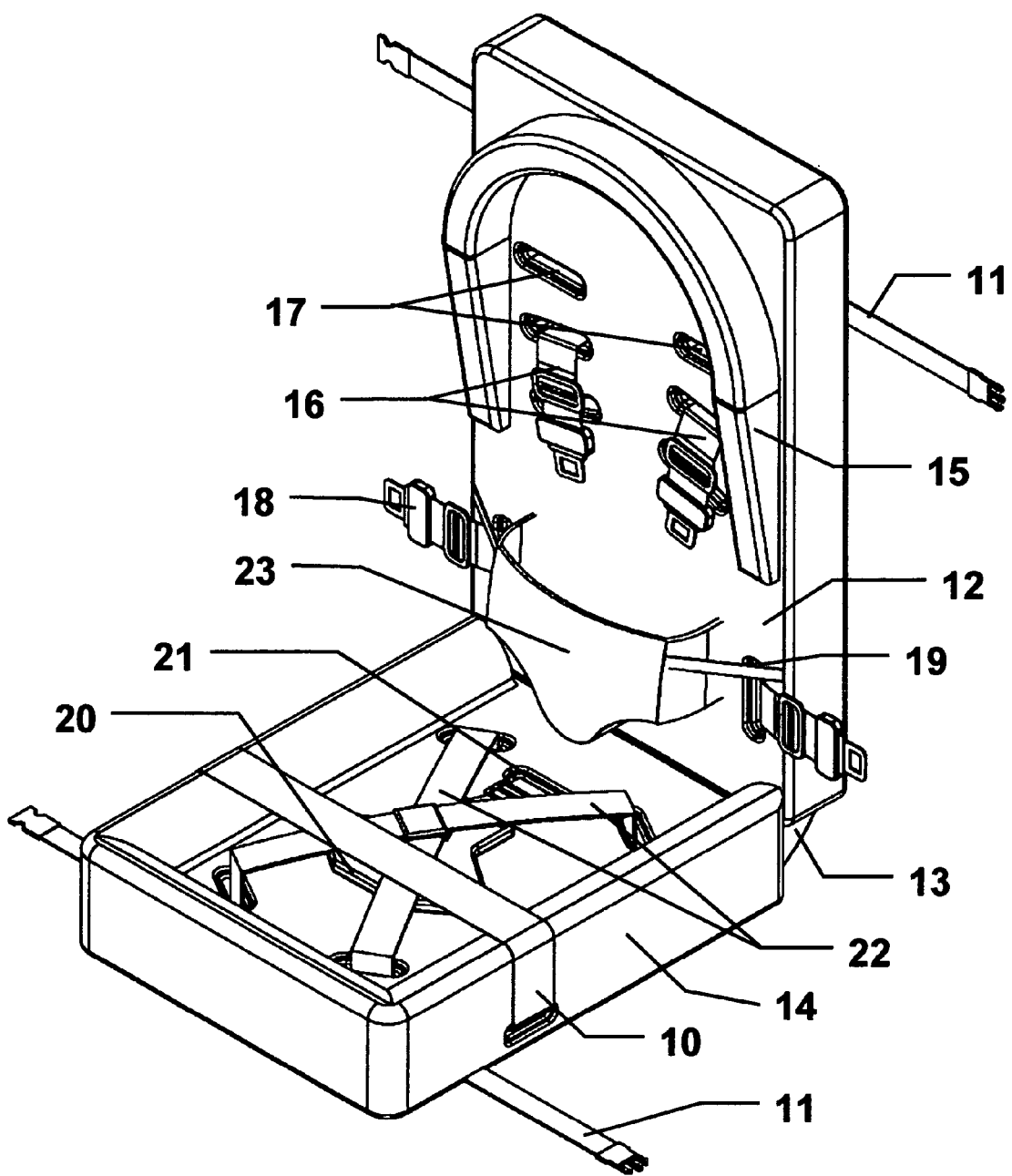
FIG. 3 is a perspective view of the portable restraint device in the occupancy position.

FIG. 3 is a perspective view of the portable restraint device in the occupancy position.

Figure 4:
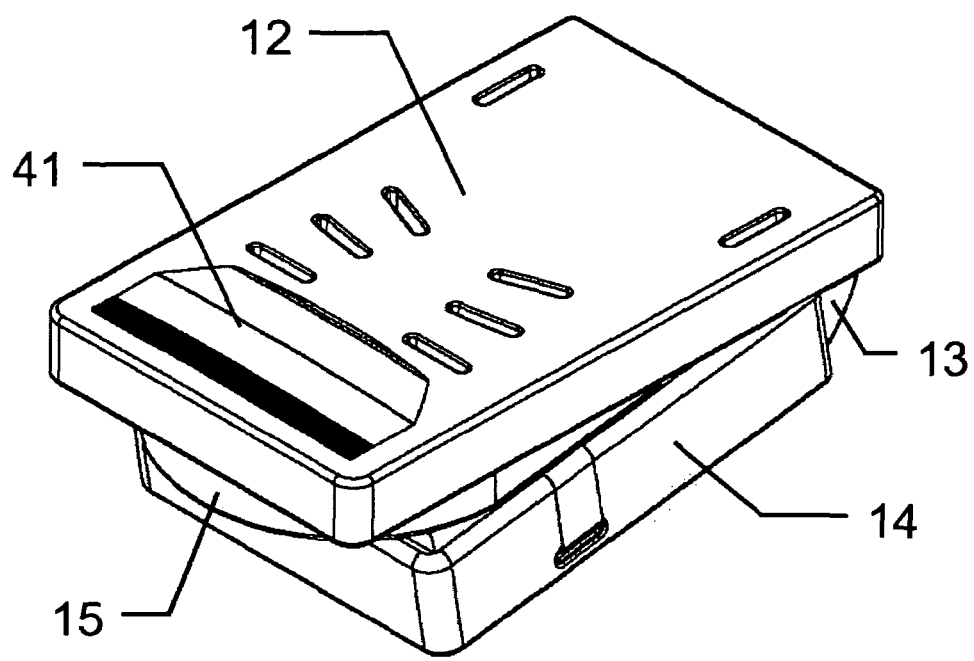
FIG. 4 is a perspective view of the portable restraint device folded for transporting.

FIG. 4 is a perspective view of the portable restraint device folded for transporting. A diaper pouch 41 is optionally mounted to the rear side of the back portion for transporting diapers and such.

Figure 5:
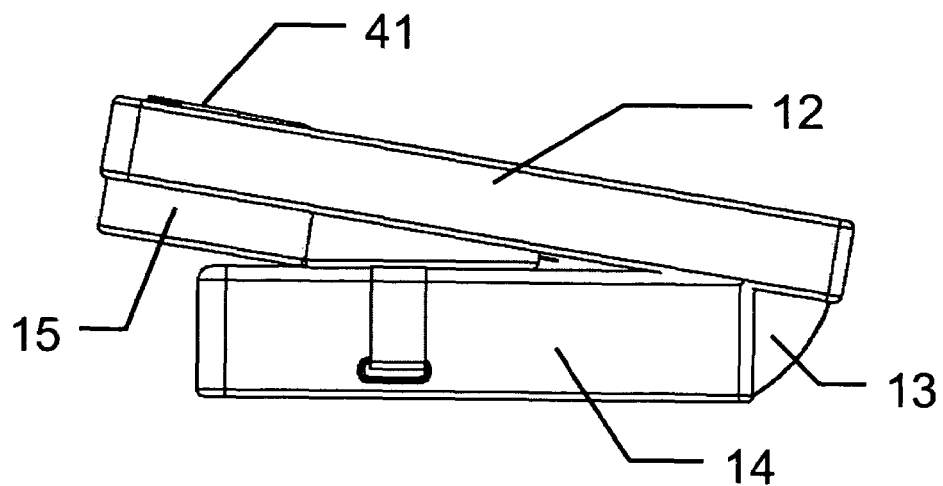
FIG. 5 is a side view of the portable restraint device folded for transporting.

FIG. 5 is a side view of the portable restraint device folded for transporting.

The instant invention has been shown and described herein in what is considered to be the most practical and preferred embodiment. It is recognized, however, that departures may be made therefrom within the scope of the invention and that obvious modifications will occur to a person skilled in the art.

I claim:

1. A child restraint device for use with a vehicle seat comprising;
    a back portion having a forward side and rear side, said back portion further comprising at least one device selected from the group consisting of head padding, adjustable shoulder belts, adjustable lap belts, and a first means for mounting said back portion to a vehicle seat, and
    a bottom portion foldably coupled to said back portion, said bottom portion having a top side and bottom side, said bottom portion including a buckle harness assembly, leg strap, cross-strapping and a second means for mounting said bottom portion to a vehicle seat.

2. A child restraint device of claim 1 wherein said head padding is adjustably disposed to the forward side of said back portion.

3. A child restraint device of claim 1 wherein said adjustable shoulder belts further comprises at least two adjustable shoulder belts removably disposed through at least two shoulder belt cutouts.

4. A child restraint device of claim 1 wherein said adjustable lap belt further comprises at least two adjustable lap belts removably disposed through at least two lap belt cutouts.

5. A child restraint device of claim 1 wherein said first means and said second means for mounting further comprises at least two mounting straps.

6. A child restraint device of claim 1 wherein said buckle harness assembly is removably disposed through a buckle harness assembly cutout.

7. A child restraint device of claim 1 wherein said leg strap is removably disposed on said top side of said bottom portion.

8. A child restraint device of claim 1 further comprising a diaper pouch removably disposed to said rear side of said back portion.

9. A child restraint device of claim 1 further comprising said cross-strapping removably disposed on said top side of said bottom portion.

10. A child restraint device of claim 1 further comprising a toddler seat removably disposed to said forward side of said back portion.

* * * * *